United States Patent [19]

Perry

[11] Patent Number: 5,042,724
[45] Date of Patent: Aug. 27, 1991

[54] FLUORESCENT TUBE CRUSHER WITH PARTICULATE SEPARATION AND RECOVERY

[76] Inventor: Timothy J. Perry, 1875 Piedras Cir., Danville, Calif. 94526

[21] Appl. No.: 458,178

[22] Filed: Dec. 28, 1989

[51] Int. Cl.$^5$ .................................................. B02C 19/12
[52] U.S. Cl. .......................................... 241/19; 241/24; 241/57; 241/60; 241/79; 241/99; 241/100; 241/DIG. 14
[58] Field of Search ...................... 241/99, 60, 57, 24, 241/79.1, 18, 19, DIG. 14, 152 A, 79, 100

[56] References Cited

U.S. PATENT DOCUMENTS

| | | |
|---|---|---|
| 2,091,772 | 8/1937 | Steele . |
| 2,185,352 | 1/1940 | Peters . |
| 2,558,255 | 6/1951 | Johnson et al. . |
| 2,593,657 | 4/1952 | Coon et al. . |
| 2,620,988 | 12/1952 | Tellier . |
| 2,628,036 | 2/1953 | Hall . |
| 2,679,316 | 5/1954 | Ruepp . |
| 2,785,767 | 3/1957 | Glidden . |
| 2,866,604 | 12/1958 | Hall . |
| 2,962,230 | 11/1960 | Dilley et al. . |
| 3,308,609 | 3/1967 | McCulloch et al. . |
| 3,333,777 | 8/1967 | Highfill, Jr. et al. . |
| 3,353,756 | 11/1967 | Morgenson . |
| 3,655,138 | 4/1972 | Luscombe . |
| 3,889,886 | 6/1975 | Spivey ................................ 241/99 X |
| 3,913,849 | 10/1975 | Atanasoff et al. . |
| 4,037,795 | 7/1977 | Fufe ................................. 241/79.1 X |
| 4,084,755 | 4/1978 | Shimollzaka et al. ............. 241/99 X |
| 4,361,290 | 11/1982 | Francis ........................... 241/79.1 X |
| 4,545,540 | 10/1985 | Nakamura ............................ 241/99 |
| 4,637,558 | 1/1987 | Jenzsch et al. ........................ 241/79 |

Primary Examiner—Mark Rosenbaum
Assistant Examiner—Frances Chin
Attorney, Agent, or Firm—O'Keefe & Wilkinson

[57] ABSTRACT

A digesting system for disposal and separation of the component materials, including potentially toxic materials, from used fluorescent tubes, wherein the fluorescent tubes are fractured with a rotating fracture blade while passing stripping air through the fracture zone and the fractured glass is then passed countercurrently through a countercurrent flow zone with a rapid flow of stripping air. As the fractured glass particulates descend or fall through the countercurrent flow stripping gas zone, they impact upon a plurality of baffles or impact surfaces that jar the particulates separating additional small powder particulates from the surface of the glass particles. The small dust or powder particulates separated from the glass by the air stream and the jarring surfaces are then separated from the air stream by a sequence including an initial cyclone or the like from which particulate material collected may be removed during continued operation and by subsequent fine filter means and a final activated carbon filter to remove metallic vapors.

12 Claims, 1 Drawing Sheet

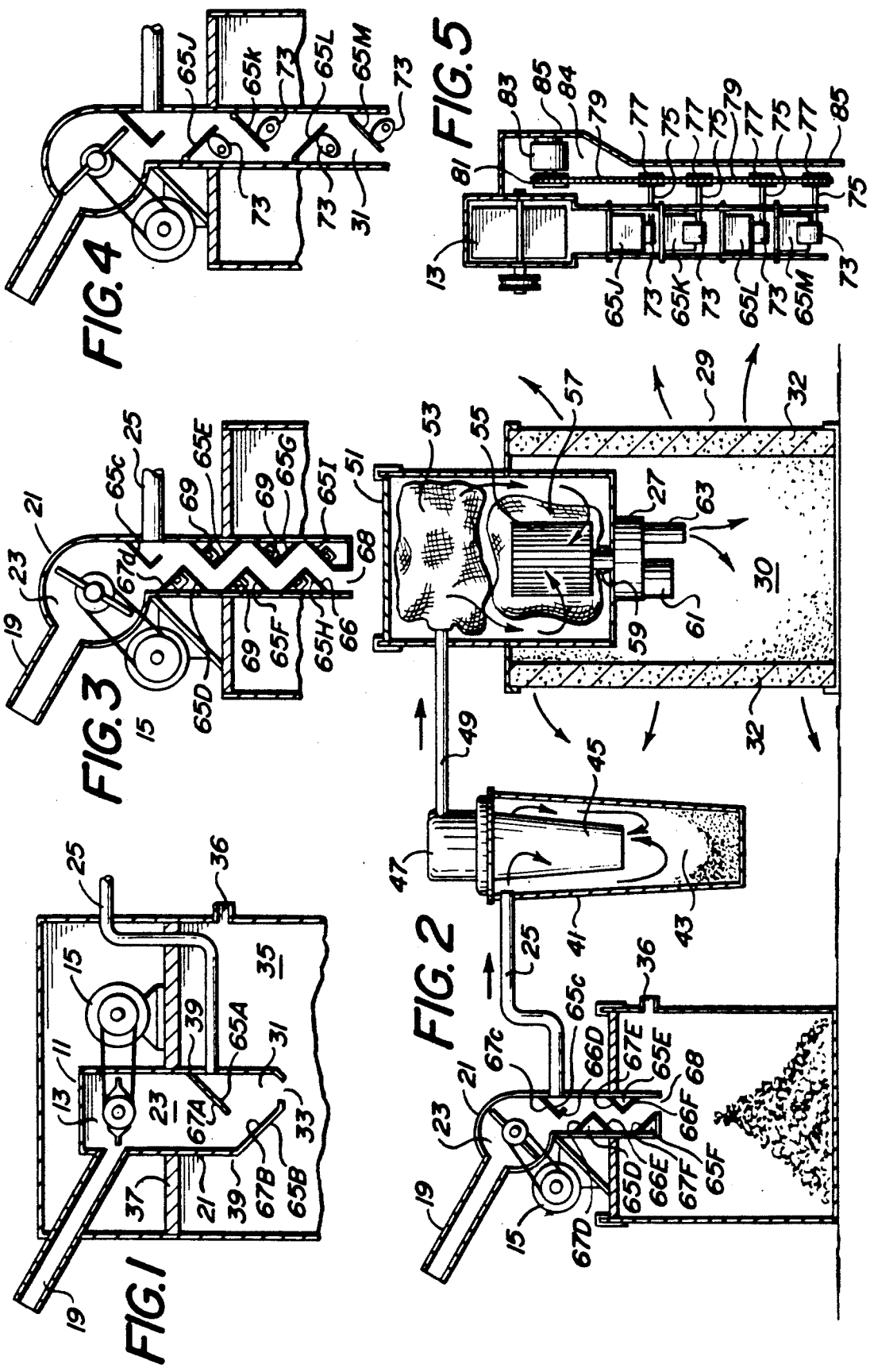

FLUORESCENT TUBE CRUSHER WITH PARTICULATE SEPARATION AND RECOVERY

RELATED APPLICATIONS

This application is related to a concurrently filed application entitled "Fluorescent Tube Crusher with Particulate Separation and Recovery" filed by the present inventor herein and a co-inventor and directed more particularly to the arrangement of the fracture chamber and countercurrent stripping chamber and method of using disclosed incidentally in connection with FIG. 1 and 2 of this application.

BACKGROUND OF THE INVENTION

1. Field of the Invention

The present invention relates to the crushing or digestion of used fluorescent tubes. More particularly, the present invention relates to a combined crushing and separation system in which a clean separation is made between the crushed glass and the potentially toxic fumes and powders contained within the interior of the fluorescent tube. More particularly still the present invention relates to impact separation of powder material adhering to sections of the glass envelope of fluorescent tubes.

2. Discussion of the Prior Art

Fluorescent light tubes are formed from elongated or tubular glass receptacles which are charged with mercury or other conductive vapors. The inside surface of the tube is coated with a fluorescent coating of some form such as phosphorus itself or other phosphor powders such as beryllium and cadmium compounds and the like. Mercury vapor as well as beryllium and cadmium are well known as potentially toxic materials as are other phosphor powders with which the inside of a fluorescent tube may be coated. Older fluorescent tubes often used fairly high concentrations of beryllium powders, but this has been, in general, superseded in more recent fluorescent tubes by cadmium-type powders.

Since fluorescent tubes are in general, bulky and unsatisfactory for disposal without treatment, it has become customary to crush them into small pieces by various means and then dispose of the fractured pieces. Merely fracturing the tube itself into small pieces for disposal, however, is not very satisfactory because of the potentially toxic nature of the dust and vapor originally confined inside the fluorescent tube. Such potentially toxic particulates, which occur mostly in the form of small dust particles plus mercury vapor and small drops or beads of mercury, can be quite detrimental if they escape to the environment.

While it might be possible to refurbish burned out fluorescent tubes by removing the metal ends or "tips" from the tubular glass envelope and cleaning the inside followed by recoating the inside of the tube with fluorescent or phosphor powder material, followed by the addition of new tips and recharging with conductive metallic vapor, as a practical matter, the cylindrical glass container itself has little intrinsic value. Furthermore, it is difficult to properly renew the internal fluorescent surface of the tube and difficult to reapply the metallic tips to form an effective seal with the ends of the tube. It is usually more economical, therefore, to manufacture new fluorescent tubes than to refurbish worn out tubes. It has consequently become customary to dispose of the used tubes. However, because of their bulky nature, it is difficult to adequately dispose of the tubes except by crushing to reduce their bulk followed by disposal of the residue in a hazardous material landfill or dumpsite or the like. While it has been recognized the toxic particulates and vapors should be contained somehow, the usual manner of handling the toxic dust and vapor has been either to ignore it or to crush the tubular receptacle while washing by means of a flow or stream of water to prevent the escape of toxic material to the environment. Ignoring the toxic materials is no longer either acceptable or possible. Wetting down the crushed glass and other materials, on the other hand, creates what can only be referred to as a "soggy mess" which not only is difficult to dispose of, but weight-for-weight has become heavier and even more difficult to dispose of than the original dry material, particularly in view of its toxic nature.

It has long been known to provide apparatus for breaking crushing glasswear and particularly glass bottles and the like to reduce their bulk and incidentally to prevent their reuse particularly in the case of liquor bottles and the like. Among such apparatus may be mentioned the following:

U.S. Pat. No. 2,185,352 issued Jan. 2, 1940 to C. F. Peters discloses an inclined chute leading into a glass receptacle. A foot operated hammer is arranged to strike a bottle resting in the chute, breaking it and allowing the fractured glass pieces to fall into the glass receptacle.

U.S. Pat. No. 2,558,255 issued June 26, 1951 to N. E. Johnson et al. discloses a remote controlled glass breaking machine in which bottles in particular are slid down a tube to intercept a horizontally rotating motor driven fracturing blade.

U.S. Pat. No. 3,353,756 issued Nov. 21, 1967 to D. J. Morgenson describes a further type of horizontally rotating hammer blade through which glasswear such as bottles are dropped. The blades rotate at a high speed such as 1700 r.p.m.'s so that a bottle dropped through the blades may be struck as many as sixty times for each second the bottle remains in the contact zone.

U.S. Pat. No. 3,655,138 issued Apr. 11, 1972 to G. A. Luscombe strikes bottles or other glasswear inserted down a chute with a plurality of rotating hammer blades. Deflecting blades are arranged under the hammer blades to enhance distribution of the glass material under the hammer blades.

U.S. Pat. No. 3,889,886 issued June 17, 1975 to J. D. Spivey discloses a waste bottle fracturing device in which bottles fall through or past safety baffles which slow down the entrance of the bottles into rotating multiple arm blades and prevent broken glass from being ejected upwardly out of the crusher.

While it has been known, therefore, generally to crush glasswear by mechanical crushing means in order to decrease its bulk prior to disposal, the crushing of glass bottles and the like and the crushing of glass receptacles containing hazardous materials such as fluorescent tubes and the like is something quite different. Hazardous materials such as the toxic phosphors coating the inside of fluorescent tubes or the mercury vapor trapped in the tube adds an entirely new dimension to the problem. A number of devices, machines and/or systems have been suggested or developed for the crushing of fluorescent tubes in order to decrease their bulk. Some of such devices are the following:

U.S. Pat. No. 2,593,657 issued Apr. 22, 1952 to A. J. Coon et al. discloses a reciprocating-type crusher designed to crush fluorescent tubes and the like. Coon et al. discloses that during crushing of the tubes the beryllium compound that adheres to the inner walls of the tube as a layer of dust has a tendency to become suspended in the surrounding air. Coon et al. attempts to alleviate this problem by providing an exhaust for air withdrawn from the treatment or fracturing zone and releasing such air "to the outer atmosphere whereupon it is safely dispersed into space". Coon et al. also discloses that he uses an airtight casing so there is as little escape of air and dust as possible until the air stream is discharged to the outer atmosphere. While Coon et al. uses an air stream to remove toxic materials from the tube fracturing zone of the machine, there is no evidence that Coon et al. recognized that a fairly tight fit should be maintained about the fracturing zone in order to make a reasonably clean separation between the toxic materials and the glass particles.

U.S. Pat. No. 2,620,988 issued Dec. 9, 1952 to E. H. Tellier discloses a fluorescent tube chopping device arranged for continuous flushing of the fracturing zone with a stream of water to flush the toxic materials from such fracturing zone. There is no separation between the potentially toxic dust and the crushed pieces of glass, both being collected in a lower removable receptacle. Because the potentially toxic materials are not removed from the glass particulates, the materials cannot be used again, since the toxic materials prevent re-use of the glass and the glass, in effect, contaminates the remainder of the materials originally contained within the outer tube or sheath preventing their recovery.

U.S. Pat. No. 2,628,036 issued Feb. 10, 1953 to J. B. Hall discloses a fluorescent lamp disposal arrangement in which fluorescent tubes are passed lengthwise down a tubular inlet at the bottom of which the fluorescent tubes are progressively fractured into pieces by a rotating hammer arrangement. A large suction fan is arranged at the top or upper end of the system and a water inlet is arranged just above the chopper blades. During operation of the device, therefore, there is a countercurrent flow of material through the apparatus with fractured tube material traveling downwardly together with flushing water or other material and the air stream passing upwardly to draw out gases. The fractured glass and metal may be separated from the water containing the toxic beryllium powder by means of a screening arrangement and the metal tips separated from the glass by magnetic means.

U.S. Pat. No. 2,866,604 issued Dec. 30, 1958 to J. B. Hall discloses a fluorescent tube disposal device including a rotary breaker arm disposal arrangement bathed in water during actual breaking of the fluorescent tubes. Hall uses a magazine to contain the fluorescent tubes and provides for a draft of air to be drawn through the magazine during use.

U.S. Pat. No. 3,913,849 issued Oct. 21, 1975 to I. M. Atanasoff et al. discloses a fluorescent tube digester or breaker. The Atanasoff et al. device is made to fit on the top of a barrel and to draw air downwardly through the chamber and out the usual bung hole where there is provided a surface filter arrangement to remove phosphorus and mercury from the air stream.

While the prior devices noted above have enjoyed at least a modicum of success, serious problems and inconveniences have persisted. In particular, the separation between the toxic materials and the supporting and confining materials has not been sufficient to allow such supporting and confining materials, i.e. essentially the glass, to be disposed of or reused without special precautions because of hazardous inclusions and the toxic material i.e. the mercury, beryllium, cadmium, and other fluorescent materials, have not been separated sufficiently from the supporting and confining materials, i.e. the glass, to allow handling in a relatively constricted volume and/or effective complete recovery. The most successful systems, furthermore, have incorporated a washing step. Washing, however, creates a large volume of polluted water which must then be dealt with in turn and in addition, creates wet, heavy and often sticky materials that are inherently difficult to handle and/or dispose of. There has been, consequently, a definite need for a method and means that is economical, convenient and effective in treating or digesting used fluorescent tubes and that makes an effective separation of the toxic materials from the supporting and confining materials by a dry separation means.

THE RELATED INVENTION IMPROVED UPON

The concurrently filed application of the present inventor and a co-inventor entitled "Fluorescent Tube Crusher with Particulate Separation and Recovery" describes a fluorescent tube crushing apparatus that provides superior separation and recovery of toxic powders coating the interior of fluorescent tubes from fractured glass particulates comprised of particles of the broken or crushed glass envelope of the tube. Metallic vapors from the tube, mostly comprising mercury, are also efficiently separated for recovery. Such superior separation and recovery is accomplished by fracturing the fluorscent tubes in a restricted fracturing chamber through which a rapid stream of gas or air is drawn and then exposing the fractured pieces of glass to a very rapid countercurrent flow of a stripping gas which strips from the surface of the glass particulates any loose powder still adhering to the glass. The flows of gas through the fracturing chamber and through the countercurrent stripping chamber are then combined and directed to a filtering system comprising an initial centrifugal separator followed by several fine filters and a final activated carbon metallic vapor absorption system. The air or other stripping gas flow through the countercurrent stripping chamber is very rapid in order to separate the powder from the surface of the fractured glass particulates, while the flow of air or other gas at the other end of the system through the activated carbon filter medium is relatively slow, the differential being attained by increasing the relative size of the passage through which the gas passes to control the relative velocity of gas passage.

While the separation between toxic materials and fractured structural materials, i.e. glass particulates, is very effective in the invention described in the concurrently filed application, a complete or 100% separation has not been found possible. Consequently, there is a need for improving the separation of the glass particulates and the objectionable other powder and vapor-type materials.

OBJECTS OF THE INVENTION

It is an object of the present invention, therefore, to provide an apparatus for treating used fluorescent tubes that effectively separates the toxic materials from the supporting and confining materials by a dry method.

It is a further object of the invention to provide a method and means for treating used fluorescent tubes to reduce the tube material to a minimum volume while effectively separating toxic materials from the glass tube material by, in effect, jarring the factured glass particulates to improve separation of toxic powder from such particulates by an air stream.

It is a still further object of the invention to provide a method and means for separating the toxic materials from the structural material of a fluorescent tube by an air separation method involving jarring the glass particulates while exposing them to an accelerated countercurrent stripping gas stream.

It is a still further object of the invention to provide a method and means for separating toxic materials from the structural material of a fluorescent tube by means of a baffle arrangement that intercepts fractured portions of the structural material and jars or shakes toxic material from their surfaces by imparting a vibratory motion to the particulates while at the same time removing the toxic material with a very rapid gas stream.

It is a still further object of the invention to make a clean separation by a dry method of the toxic materials in used fluorescent tubes more efficient by impacting particles of the fractured fluorescent tubes with a baffle or jarring surfaces which have a vibratory motion imparted to them to increase the force with which such surfaces impact particulates coming into contact with them.

Other objects and advantages of the invention will become evident from reference to the accompanying drawings and description.

BRIEF DESCRIPTION OF THE INVENTION

It has been found by the present inventor that an improved separation can be made between the toxic powder coating the inside of fluorescent tubes and the glass material which is coated, if during the active fracturing of the glass into restricted sized pieces, a large draft of flow stripping gas such as air is passed through a chamber having baffles upon which the glass particulates impact. The jarring and shaking of the glass incident to forceful contact with the baffles or jarring surfaces effectively shakes from the glass particulates a major portion of the toxic dust originally coating the inside surface of the tube before fracture of the tube and this toxic dust is then entrained in a very rapid flow of gas across the surface of the fractured pieces of the glass. Countercurrent flow of the entrainment gas with respect to the fractured glass particulates is preferably provided during at least the terminal portion of the passage of the glass through the fracturing apparatus.

BRIEF DESCRIPTION OF THE DRAWINGS

FIG. 1 is an overall partially broken away side view of one embodiment of the apparatus of the invention.

FIG. 2 is a broken away side view of a second embodiment of the invention in combination with a filtering and absorption arrangement for removing the toxic remainder products from the stripping gas or air stream.

FIG. 3 is a broken away enlarged side view of the fracture and countercurrent flow chambers of the invention showing impact baffles or jarring surfaces within the countercurrent stripping chamber supplied with vibrating apparatus.

FIG. 4 is a broken away enlarged side view of an alternative embodiment of the countercurrent flow chamber of the invention showing impact surfaces or baffles provided in the countercurrent flow chamber and supplied with motion imparting means for increasing the jarring effect upon particulates striking their surfaces.

FIG. 5 is a broken away end view of one embodiment of the invention shown in FIG. 4 showing in particular, the power train arrangement for activating the movement imparting devices provided to activate the motion of the baffles shown in FIG. 4.

DESCRIPTION OF THE PREFERRED EMBODIMENTS

As indicated above, the present invention has provided a very efficient fluorescent tube chopping and recovery apparatus which effects a very complete dry separation between fractured glass particulates and the potentially toxic particles or dust coating the inside of the original glass envelope of a fluorescent tube plus the metallic vapor within the tube. The concurrently filed application of the present inventor and his co-inventor entitled "Fluorescent Tube Crusher with Particulate Separation and Recovery" discloses a fluorescent tube crushing apparatus that establishes an accelerated flow of gas through a two-part fracture and separating zone. The first portion of such zone is a fracture zone where fluorescent tubes are fractured by a rotating blade journaled rather snugly in a casing through which air or other gas is passed at a fairly rapid rate to maintain a rapid flow of gas through the chamber within the casing at all times in a downwardly direction or broadly in the direction in which the glass particulates are directed when the tubes are shattered. The flow of air or other gas is at least generally concurrent with the direction of passage of the fractured glass particulates through and from such chamber.

Immediately below the fracture chamber is positioned a countercurrent flow gas stripping chamber through which the fractured glass particulates fall after leaving the fracture chamber. The countercurrent flow stripping chamber is supplied with a rapid flow of a dust or powder stripping gas such as air which travels generally upwardly countercurrently to the glass particulates stripping away any loose powder from the surface of the glass particulates. A gas offtake is provided between the fracture chamber and the countercurrent flow chamber. Both the gas passing downwardly through the stripping chamber and the stripping gas passing upwardly through the countercurrent stripping chamber is removed through such offtake. This arrangement enables the downwardly flowing gas in the fracture chamber to not only keep the chamber clear of accumulated dust and powder deposits, but to immediately entrain powder shaken or jarred from the surface of the fractured glass particulates, which entrained powder is removed from the vicinity of the surface of the glass particulates. This entrained powder is then, as the glass particulates fall through the the up-welling clean gas rising through the countercurrent stripping chamber, quicky removed from the vicinity of the glass particulates and conveyed from the chamber through the offtake. Such sudden separation is believed to prevent clumping or sticking of the powder to the glass particulates by electrostatic or other influences. Meanwhile, the glass particulates fall through the rapidly upwardly flowing stripping gas which further strips any loose powder from the surfaces of the glass particulates and carries such powder upwardly and out the outlet or offtake from the powder.

The flow of gas through the fracture chamber should be sufficiently rapid to prevent buildup of powder deposits in the fracture chamber and also to prevent backflow of any gas from the chamber as the flow pulsates due to consecutive passage of fluorescent tubes down the feed tube and also due to occasional possible implosion of fluorescent tubes as they are struck by the fracture blade. The flow of stripping gas, on the other hand, must be sufficiently accelerated to carry all dust and powder upwardly and to strip loose powder from the surface of falling glass particulates, but not so accelerated as to carry glass particulates, or at least most of the glass particulates, upwardly with the gas.

While the invention which is the subject of the concurrently filed application, upon which the present invention is an improvement, makes a very effective separation of the glass particulates and toxic powder or dust originally coating the interior of the glass envelope constituting the containment envelope and the toxic powder of fluorescent tubes, such separation is not complete. Consequently, there is a need to improve the separation beyond the already very effective separation provided by such related invention.

The present inventor has further found that the efficiency of separation of the toxic dust or powder from the glass particulates can be very significantly increased by the provision, preferably within the countercurrent stripping chamber, of particulate baffles upon which the falling glass particulates derived from the fracturing chamber may impact as they descent or fall through the countercurrent stripping chamber. Forceful impact of the glass particulates with the slanted impact surfaces jars or shocks the glass particulates and imparts significant internal vibration to such particulates which tends to separate the outer powder particles from the glass particulate or at least to loosen them upon the surface of the particulates so that the rapidly flowing air stream passing countercurrently with the glass particulates tends to separate the powder from such particulates. The impact of the glass particulate with the baffles must be sufficient to tend to shake or loosen at least some of the toxic powder adhering to the glass particulates, but not so great as to fracture the particulates since if the particulates are broken into too small sizes, the force of the countercurrent air will carry the glass particulates upwardly with the powder material, thus defeating the desired separation.

Since the baffles should be themselves kept clear of deposits of powder or other detritus materials, it is desirable for them to be maintained at an angle which will facilitate clearance of powder and other materials from the baffle surface. Angling of the baffle also serves to direct an impacting particle to bounce or rebound at an angle toward a lower baffle ensuring that each particulate strikes all baffles which are preferably arranged on opposite sides of a central opening through which the rapid air or other gas stream passes. The angle of the baffles also determines, in some respect, how great the force of impact will be, since a direct impact perpendicular with the plane of the baffle will be greater and will be more likely, in many cases, to shatter the glass particulate itself, while a somewhat more glancing impact will be less likely to shatter the glass particulates, but may be almost equally effective at dislodging toxic powder from the surface of the glass particulate material.

The relative impact of a glass particulate with a baffle may also be regulated statistically by the use of oscillatory or vibratory baffles. If the baffle is equipped with a vibrator which continuously moves the baffle back and forth in an oscillatory pattern, the glass particulates will strike the baffle during various portions of it's oscillatory cycle. If the baffle in its vibratory cycle is moving upwardly toward a particulate when the particulate strikes the baffle, an extra force is imparted to the particulate. On the other hand, if the baffle is moving downwardly when struck by the particulate, the force imparted will be less. Consequently, when a vibratory or other oscillatory baffle is used, it is necessary for there to be a plurality of such vibratory baffles so that on the average at least one strikes any given particulate an increased blow. One harder blow among several lesser blows may be significantly more effective in removing powder from the particulate than several lesser impacts. Consequently, while the average impact may remain statistically essentially the same, the actual impacts may become more effective, and if there are a plurality of baffles or jarring surfaces, at least one is likely to be struck when moving upwardly with increased effectiveness in dislodging powder from the particulate surfaces.

It has been found by experimentation that it is important that the stream of countercurrent air or other stripping gas flowing up through the countercurrent stripping chamber and past the baffles be significantly more accelerated than the stripping gas such as air passing through the fracture chamber or zone. The differential in speed may desirably be, in fact, in the neighborhood of about 100 to 1, i.e. the flow of air or other stripping gas through the countercurrent stripping zone should have a velocity approximately one hundred times the velocity of passage of air through the fracture zone. This large differential is believed to be due to the fact that the passage of gas through the fracture zone should be sufficient to prevent back flow of gas out of the feed tube or opening into the fracture chamber and under sufficient vacuum or reduced pressure in order that the fracture chamber is continuously under vacuum so any leaks in the chamber will experience a net inward flow of air to prevent the escape of any toxic powders or fumes from the chamber. The gas passage through the fracture chamber should also be sufficiently rapid to keep the chamber clear of any significant build-up of powder or dust in the portions not swept by the rotating fracture blades. The air or other gas flow through the chamber should also be sufficiently rapid so that the powder released from the fractured glass particulates is immediately entrained in the gas and tends to be carried separately from the glass particulates through and from the chamber. It has been found that a gas flow velocity of approximately at least 50 to 75 cubic feet per minute through each square inch of open cross sectional area of the fracture chamber is adequate for such flow of gas to keep the fracture chamber clear and generally entrain the powder separated from the surface of the glass. Since the flow of gas tends to be impeded when fluorescent tubes are inserted into the feed chute or orifice and to resume more freely when the tube is drawn into the fracture chamber, the gas flow through such chamber tends to assume during operation, a pulsing or pulsating nature or characteristic which aids in removing deposits of dust from the chamber in the air or gas stream. In addition, since some of the fluorescent tubes implode when first struck by the fracturing blade in the fracture chamber, these implosions cause a further disturbance in the gas flow. It is important that there be sufficient flow of gas engendered by a sufficient negative pressure or vacuum on the opposite side of the chamber so that no blow back from the chamber to the environment occurs even when a fluorescent tube implodes. As indicated, a gas flow of from 50 to 75 feet/minute is the lower limit of suitable flow in this respect, but it is preferred to have a gas flow through the fracture chamber of at least 100 to 200 feet/minute or even greater to make certain no toxic powder escapes even during implosions of the tubes.

The countercurrent air or other stripping gas passing upwardly through the countercurrent stripping chamber, should be very rapid so as to physically strip any loose phosphor powder from the surface of the glass particulates and remove it from the vicinity of the glass particulates. Basically, the acceleration or, more correctly, the velocity of the gas through the countercurrent stripping chamber should be at least in the neighborhood of 7200 feet/minute and may range up to 9000 feet/minute. A less desirable lower limit may be as little as 6000 feet/minute. The relative velocity with respect to the movement of the glass particulates is somewhat higher, since the particulates are actually falling through the gas, providing a relatively higher differential speed between the glass and the stripping gas. Stated in functional terms, the velocity of the stripping gas should be sufficient to strip substantially all loose powder from the surface of the descending glass particulates and to carry all loose powder upwardly away from the glass particulates into the gas offtake from the chambers allowing no loose powder to exit from the bottom of the stripping chamber, but not sufficient to carry the glass particulates upwardly. Preferably, the glass particulates should not be significantly retarded in their passage under the influence of gravity downwardly through the stripping chamber. This, of course, depends somewhat upon the size of the glass particulates. If the glass particulates become very small or powder-sized, they will be carried upwardly, particularly if the countercurrent stripping gas flow is very fast.

When the upwardly flowing stripping gas reaches the outlet, it should also substantially entrain all the gas and entrained powder in the stream of gas passing downwardly or substantially downwardly through the fracturing chamber. As indicated, a velocity of stripping gas through the countercurrent stripping chamber of 7200 feet per minute has been found to be very satisfactory, but the exact velocity may vary. The upper limit will somewhat depend upon the fracture size of the glass particulate as larger pieces of glass will fall through a higher velocity gas stream without being significantly retarded or carried away. The lower limit cannot be less than will effectively carry upwardly the phosphor powders removed or separated from the glass particulates.

The air stream exhausted from the fracturing zone and the countercurrent air flow zone are then passed initially into a rough particulate separator that can be continuously cleaned or emptied, or at least has a large capacity between cleanings such as a centrifugal or cyclone separator where the principal portion of the removed particulates are separated from the gas stream. The gas stream is then pased through a fine filter fabric or other fine filter which removes the residual dust particulates. The entire air stream is then passed through an activated carbon or charcoal-type filter where metallic vapor such as mercury vapor is removed from the gas. The air exiting from the activated carbon filter is completely particulate-free and has also been cleansed of metallic vapors.

FIG. 1 shows diagrammatically a side elevation of a partially broken away depiction of the fluorescent tube treatment apparatus of the invention. An initial fracturing and separating device or means 11 is provided with a rotating blade 13 powered by a motor 15. The rotating blade is positioned to rapidly strike the end of a fluorescent tube, not shown, that is extended or passed progressively down a feed chute 19. The rotating blade 15 is preferably rotated, as shown in FIG. 1, counterclockwise so that the tube or glass envelope 17 is struck downwardly, progressively breaking off small chunks of the tube which at the same time shatter into individual pieces of glass. These individual pieces of glass are thrown against the side of the chamber. The shock of both the initial fracturing and the later impact with the walls 21 of the fracture chamber 23, i.e. the upper portion containing the fracture blade 13 of the fracturing and separation device 11, causes the dust particulates coating the inside of the glass envelope to be jarred loose from the surface. These small dust particulates, which are normally adhered to the inside of the fluorescent tube by a suitable thin film of adhesive or other suitable expedients, after jarring loose become entrained in the air stream within the chamber, which air stream or flow passes initially down the feed chute 19 alongside the fluorescent tubes into such chamber and progresses through the fracture chamber 23 to the exhaust conduit or tube 25 which opens into the fracturing and separating device 11 just below the fracture chamber 23. A vacuum or suction is applied to the exhaust tube 25 from a suction or draft device farther down the line, in this case through a suction fan 27, as shown in FIG. 2, which discharges air drawn through such fan with a forced draft directly into a massive activated carbon or charcoal-type filter 29 also shown in FIG. 2.

Below the fracturing chamber 23 of the fracturing and separating device 11 is positioned a countercurrent flow chamber 31 having a decreased diameter lower end through which air is sucked upwardly from the terminal opening 33 from a particulate collection chamber 35 (see FIG. 2) which may comprise a steel barrel-type collector or any other type collector. A top or lid 37 closes off the upper portion of the barrel collector and in the embodiment shown also supports the fracturing and separating device or means through the side walls 39 of the countercurrent flow chamber 31.

Within the countercurrent flow chamber 31 in FIG. 1, there are provided two baffles or jarring surfaces 65a and 65b shown extended from the side wall of the counter-current flow chamber 31. These baffles 65 are provided with generally upwardly directed slanted impact surfaces 67 onto which the glass particulates drop or are initially projected by the rotating blades 13 and then bounce from the first to the second of such surfaces. Each impact with the impact surfaces 67a and 67b has been found to dislodge additional powder and any other contaminants from the surfaces of the fractured glass particulates and to significantly increase the separation between the glass and the toxic powder particles. Between impact surfaces, the glass particulates pass downwardly through the countercurrent flow of stripping gas which removes dislodged toxic particles and other particulates from the immediate vicinity of the glass particulates and carries them upwardly into the suction or outlet tube 25. While only two jarring baffles 65a and 65b are illustrated in FIG. 1, the first extending outwardly into the countercurrent flow chamber 31 from the end wall 39 at the top of such chamber, and the second constituting a matching oppositely slanted portion of the actual side wall 39 of the countercurrent flow chamber 31, additional jarring surfaces of the same configuration or even of other configurations can be provided in the countercurrent flow chamber.

The fractured or broken glass particulates, after being fractured in the fracture chamber 23, fall through the countercurrent flow chamber 31 and through the terminal orifice 33 into the collection chamber 35. During their passage, essentially in a free fall state downwardly through the countercurrent flow chamber 31, they are acted upon by upwardly flowing gases or air passing through the terminal orifice 33 from the collection chamber 35 into and through the countercurrent flow chamber and into the vacuum or suction conduit 25. As these gases pass the falling glass particulates, passing downwardly through the countercurrent flow chamber, they strip any residual toxic dust precipitates from the surface of the glass particulates and carry them upwardly to the inlet of the suction tube 25 through which they are exhausted to subsequent filter apparatus to be described. As indicated previously, the velocity of the upwardly flowing gas through the countercurrent flow chamber 31 may desirably be about 7200 feet per minute. Less desirably, the gas velocity may be about 6000 to 9000 feet per minute. In all cases, the velocity of the gas passing upwardly through the countercurrent flow chamber 31 should be sufficient to strip away any loose powder adhering to the glass particulates and carry it upwardly to and out the exhaust conduit 25, but insufficient to carry upwardly any significant quantity of glass particulates. In other words, the upwardly flowing gas stream can be characterized as having a differential separation velocity as between powder originally coating the inner surface of the fluorescent tube and fractured glass particulates.

As will be understood, the glass particulates are, in the embodiment of the invention shown in FIG. 1, twice interrupted in their fall through the countercurrent flow chamber by impacting upon the impact surfaces 67a and 67b of the baffles 65a and 65b. The first such interruption is at the top of the countercurrent flow chamber 31 just after the glass particulates exit from the fracture chamber 23. At this point, many of the particulates are still traveling with residual velocity obtained from impact with the fracture blade 13. The second interruption is at the bottom of the countercurrent chamber where the glass particulates strike the baffle 65b after having bounced from the impact surface 67a of baffle 65a. Impact of the glass particulates with the impact surfaces 67a and 67b leads to vibration of the glass particulates and this vibration, as well as the original shock of impact, tends to crack off or loosen powder from the surfaces of such particulates which powder is then stripped from the surface by the rapid countercurrent flow air stream.

It will be seen in FIG. 1 that the descending gas or air passing through the fracturing chamber 23, the passage of which gas is substantially aided by the counterclockwise rotation of the rotatable blade 15, meets the upwardly passing gas or air flowing through the countercurrent flow chamber at the outlet to the suction counduit 25 and both air or gas streams there merge and pass into the conduit 25. In this manner, the falling glass particulates rather suddenly meet the upwelling body of relatively clean gas in the counter-current flow chamber 31 and the surrounding dust particulates are very effectively and quickly stripped away from the glass particulates which pass quickly through the interface between the two air streams and continue downwardly through the upwardly passing clean stripping gas.

The area at the bottom of the fracture chamber 23 where the two streams of air or other gas meet, is an area of tumultuous turbulence, due not only to the meeting of the two streams of gas, but also due to the rotation of the fracturing blades and the rapid passage of heavier glass particulates through such area of turbulence. The turbulence of the area particularly just before the glass particulates descend quickly through the interface between the two air streams is believed to aid separation of the powder from the fractured glass particulates. Fairly sudden removal of the major portion of the dust or powder particulates from the vicinity of the glass particulates as the glass particulates pass through the interface between the two air streams and meet the upwelling flow of countercurrent stripping gas is also believed to be beneficial in avoiding reuniting of the powder particulates and glass by electrostatic effects and the like. Since there should be considerably more stripping gas passing upwardly through the stripping chamber 31 than gas passing downwardly through the fracture chamber 23, the large amount of stripping gas rather easily merges with, and in effect, entrains the gas passing from the fracture chamber and carries it into the outlet or suction conduit 25.

FIG. 2 shows an alternative embodiment of the invention in which there are more than two jarring surfaces 65 within the countercurrent flow portion of the apparatus. There is, in fact, an effective labyrinth of jarring surfaces or baffles 65c, 65d, 65e and 65f with opposed surfaces 66c, 66d, 66e and 66f between which a tortuous passage 68 winds and through which a stripping gas and glass particulates move countercurrently. The stripping gas, usually air, moves up the passage at a high rate, as explained above, and glass particulates fall down through the passage 68 bouncing from one baffle or impact surface 67c, 67e, etc. to the next. As will be seen from the drawing in FIG. 2, it is physically impossible for the glass particulate to progress in a straight line through the passage 68 so that the glass particulate must, in effect, drop from one surface to the next, each time jarring and shaking the particulates and causing dislodgment of toxic powder from the surface of the glass particulates. This toxic powder is then caught up in the countercurrent air or other gas flow and carried upwardly through the tortuous passage 68 and into the take-off 25 which is positioned just below and partially in back of the upper jarring step or baffle 65c. The distance of the jarring surfaces 67c, 67d, 67e and 67f from each other should be sufficient to allow sufficient acceleration of the glass particulates as they fall from jarring surface to jarring surface to dislodge powder from the surface of the glass particulates, but insufficient to cause additional fracturing of the glass. It is undesirable for the glass particulates to be broken into too small particles else they may also be entrained in the countercurrent gas stream and removed with the toxic powder rather than with the larger glass particulates.

FIG. 2 also shows an alternative embodiment of the broad invention in which the side walls 21 of the fracture chamber 23 are curved to maintain the ends of the fracture blades always a set distance from the sidewall. This prevents any possibility of the steel tips on the end of fluorescent tubes from becoming jammed between the blade and the sidewall, although this is not likely to happen in the other embodiments either, since the steel tip tends to travel downwardly and out the bottom of the facture chamber after being struck by the fracture blade. The curved configuration also somewhat increases evenness of the air flow through the apparatus. The configuration of the fracture chamber does not, of course, have a direct effect upon the use of the baffles in the countercurrent flow chamber except that the flow of gas and particulates may be made more uniform. In the embodiment shown in FIG. 2, the top baffle 65c becomes, in effect, also a portion of the bottom of the fracturing chamber 23.

The two streams of gas or air, the one from the top fairly well saturated with small particulates separated from the fractured glass particulates in the fracture chamber 23, and the one from the bottom issuing from the tortuous passage 68 being much cleaner countercurrent stripping gas, after being drawn into the exhaust or off-take conduit 25, located just under the upper baffle 65c pass through said conduit first to a cyclone-type separator 41 where a swirling motion is set up by the angle of the gas entering from the side. Such swirling motion combined with the increase in the volume of the passage, as generally known to those skilled in the art, causes the upper range of the small particulates entrained in the gas to move outwardly in the gas stream and to separate from the gas stream against the side of the cyclone apparatus and fall along the sidewall to the bottom of the cyclone separator where the particulates can be periodically allowed to pass by gravity from the bottom of the cyclone into any suitable receptacle, not shown.

The gas from which the particulates have separated largely by having been thrown against the sides of the cyclone chamber 43 by the spiraling action of the gas, meanwhile fills the center of the chamber and wells or passes upwardly from the chamber through a central dependent conduit 45, the shape of the outer surfaces of which serves initially also to aid in initiating the swirling motion of the gas passing into the cyclone device. The upwelling gas passes through the conduit 45 into an upper chamber 47 from which it is exhausted through a further conduit 49 into the top of a filter chamber 51. Within the top of the filter chamber 51 there is preferably a high density fiber filter 53 which preferably takes the form of a paper-type filter bag into which the air passes and which holds back any particulates as the air escapes from the filter cloth. This bag receives only a small amount of particulates since the bulk of particulates have already been largely removed from the gas stream by the cyclone separator 41. The filter bag consequently needs to be changed only infrequently to remove the particulate deposits.

Below the bag filter 53 there is preferably a HEPA-type filter 55 for removing very fine particulates from the air stream. Preferably this HEPA filter is also shielded on the outside by a very fine or dense cloth filter 57 which covers the entire outside of the HEPA filter to preserve its open pores for as long as possible. A filter made from Dacron polyamide material has been found very suitable. The HEPA filter 55 is provided with an outlet 59 which leads from the filter chamber 51 to the suction fan 27 previously identified. This fan 27 is operated or rotated by a motor 61 and exhausts from an outlet 63 which opens into the approximate center of the activated carbon or charcoal filter 29 previously identified.

The activated carbon or charcoal filter 29 is formed of a central chamber 30 within the center of a series of flat activated carbon panels 32 usually about one-and-a-half to two or more inches thick. The panels are fitted together so that an essentially gas tight chamber is formed having a fairly large central opening and outer walls formed of carbon panels through which gas entering the central chamber and spreading out through the chamber slowly passes while metallic vapors such as mercury vapor in the gas are absorbed into the activated carbon. The large volume of the central chamber 30 and the large area of the activated carbon panels 32 surrounding the central chamber ensure that the gas velocity is slowed down sufficiently to allow sufficient retention time in the activated carbon panels 32 to absorb the metallic vapors in or upon the activated carbon or charcoal. After the carbon panels are partially saturated with metallic vapor, the panels 32 are changed to renew the absorption capacity of the carbon filter panels.

As known to those skilled in the art, charcoal or activated carbon is a very efficient absorbent for metallic vapors such as mercury vapor and may also serve as an effective filter for very small particulates which become entrapped both on the surface and in the pores of the charcoal. Consequently, as the fan 27 exhausts the air or gas stream through the outlet 63, the mercury vapor from the interior of the fluorescent tubes is essentially carried through the entire system and finally exhausted from the outlet 63 into the center of the activated carbon or charcoal filter 29 from which the air perculates through the activated carbon or charcoal panels or filters 32 to the exterior while the mercury vapor is absorbed by the carbon or charcoal in the panels 32. As noted above, a very large area of charcoal or carbon filters is used. This allows very extensive perculation of the air or other gas through the charcoal or activated carbon filter and effective complete absorption of the mercury vapor in the discharge from the outlet 63 by the charcoal or activated carbon. The velocity of the gas through the filter should not be greater than 65 feet/minute in order to allow absorption of all the mercury vapor from the gas stream.

It will be noted in addition that the air is forced into the activated carbon or charcoal by pressure rather than drawn through the charcoal by a negative or decreased pressure established on one side of the filter. Since the charcoal is rather dense and no substantial passages should be allowed in it, if complete mercury absorption is to be accomplished, it is more efficient for the air to be applied to the charcoal under a positive pressure rather than drawn through by atmospheric pressure working against a negative pressure. The large size of the filter, furthermore, makes it more convenient to apply a pressure gradient by forced air flow rather than by suctions against an atmospheric head.

As indicated at the beginning of this description, and as disclosed in the related co-pending application, it is critical that a fairly large, but not inordinate volume of gas pass through the glass fracturing chamber 23 at a relatively high speed in order to strip the glass particles while they are being fractured of toxic dust particles originally adhered to the inner surface of the fluorescent tube and entrain such dust or powder particles. It is also important that counter-current stripping gas be passed upwardly or countercurrently to the downward passage of fractured glass particulates as they pass from the fracturing zone. It has been found, as indicated above, that for best operation the gas should pass through the fracturing chamber at a rate of at least 50 to 70 feet per minute for each square inch of gas passage cross-sectional area in the main fracturing zone of the fracture chamber with higher flows of gas such as 100 to 200 feet per minute or greater being desirable. Likewise, it has been found that the upward gas passage countercurrently with the descending glass particulates should preferably be at a rate of at least 7200 feet per minute for each square inch of gas passage cross sectional area in the most constricted portion of the countercurrent flow chamber. This rate of gas flow can only be attained if the passages themselves are fairly constricted and the large volume of gas can be pulled through the suction tubes 25 and 49 by the suction created by the forced air fan 27. Consequently, in order to attain a consistently high flow of gas, it is important that the filter mechanism used not become easily clogged. This is accomplished by the arrangement shown in FIG. 2 and particularly by the use of the initial cyclone-type separator in the filter train.

FIG. 3 shows a diagrammatic partially broken away view of an alternative embodiment of the baffle arrangement of the invention which is essentially the same as the embodiment shown in FIG. 2, but includes, in addition, a series of vibrators 69 attached to baffles 65d through 65i. The vibrators, which may be any suitable type of industrial vibrator, cause the baffles to vibrate transversely to the plane of the baffles, i.e. up and down. If such vibration is upwardly toward a particulate approaching the baffle through the rapid airstream when the particulate strikes the baffle, the particulate will be struck with an increased force, imparting more energy to the particulate. Such jarring impact energy is converted essentially into vibration of the particulate which has a tendency to shake or jar adhering toxic powder or the like from the surface of the particulate which powder is then entrained by the rapidly upwardly flowing stripping gas stream and conveyed away from the particulates.

It will be understood that since the vibration of the baffles 65d through 65i is in an alternating up-and-down pattern at a rapid rate, there is an equal chance that the glass particulates will impact upon the baffles as they are moving away from or downwardly with respect to the particulate as that they will impact when the movement is upwardly toward the particulate. If the movement is downwardly, the impact upon the particulate will be decreased rather than increased. However, when there are a plurality of vibrating baffles, it is statistically improbable that at least one and probably several will not be moving upwardly when impacted by a particulate. Furthermore, the jarring effect of one or more increased impacts is relatively greater with respect to jarring loose recalcitrant or tightly adhered powder, than the effect of one or more decreased impacts engendered by movement of the baffle away from the impacting particulate. The overall effect, therefore, of vibrating motion imparted to the baffles is toward increasing jarring loose of any adhering powder from the glass particulates. Particularly if an increased energy impact occurs near the top of the countercurrent flow chamber or, in other words, from one of the initial baffles, such increased jarring may tend to partially crack off or separate adhering powder, which may then be completely cracked off or separated by several lesser subsequent impacts and then entrained in the countercurrent gas flow through the tortuous passage 68. In view of the above, it will be seen that the provision of vibratory motion to the baffles 65 is in most cases of significant benefit in making a separation between the glass particulates and any adhering powder.

The vibratory apparatus 69, or vibrators, provided to vibrate the baffles 65, may, as indicated above, be of any suitable industrial grade or type. Most such devices operate either because of a rapidly rotating eccentrically journaled weight or, in more modern devices, as a result of alternate magnetic attractions of a reciprocatory armature. Some such devices are sealed and may be used in dusty, dirty environments, while others should be maintained fairly clean. The preferred position of the vibrators shown in FIG. 3 allows the environment of the vibrator to be controlled by providing very close tolerance between the baffles 65 and the surrounding apparatus and by enclosing the vibrator in the space between the baffle 65 and the adjacent opposed surfaces 66. If a dust-tight interconnection between the parts is not feasible in order to allow free vibration of the baffles, a flexible durable connecting material such as nylon or the like may be provided between the parts to render them impermeable to fine dust and powder.

It will be recognized that the remainder of the structures and parts shown in FIG. 3 are the same as those shown in FIG. 2 with respect to the initial fracturing and countercurrent gas stripping portions of the apparatus up to offtake 25 and the same reference numerals have, therefore, been used to identify similar or identical portions of the two figures.

FIGS. 4 and 5 show a further alternative embodiment of the invention in which a mechanical reciprocation apparatus or arrangement is used to oscillate the baffles 65 to increase the impact of some of the baffles with the descending glass particulates. As shown in FIG. 4, each of the baffles 65j through 65m is hinged at the top edge to the side of the countercurrent flow chamber 31 and is provided on its underside with an eccentrically journaled support roller 73. Such support rollers 73 are eccentrically journaled on a series of rotatable shafts 75 which pass through the side of the chamber 31 and have on their outer ends, sprocket wheels 77 which engage with an sprocket chain 79 also engaged with the sprocket 81 on a motor 83 which serves through the sprocket chain 79 to turn all the support rollers 73. Because of their eccentric journaling, the support rollers serve to periodically raise and lower the baffles about their hinge points. Assuming that the motor and support rollers are rotated at a rapid rate, the baffles 65 will assume a rapid oscillatory motion and will, if impacted by glass particulates when they are being raised, impart a heavier impact upon the glass particulates as explained in connection essentially with respect to the vibrator operated baffles shown in FIGS. 3. It will be noted in FIG. 5 that the motor 83 and sprocket wheels 77 and chain 79 are enclosed in a chamber 84 defined between the side of the countercurrent stripping gas chamber 31 and a containing wall 85 which prevents dust and powder contamination of the moving parts.

As will be recognized, the present invention carefully balances a number of factors in order to attain an economical and efficient system. In accordance with the invention, a flow of air is established through the fracturing and countercurrent flow sections of the apparatus which is sufficient to effectively strip the phosphor from the broken or fractured glass. This requires a careful balancing of all factors, including the gas passage over the baffles of the invention whereby the air flow through the noted chamber is sufficient to strip the phosphor material from the glass surfaces and prevent escape of phosphor or mercury laden air, combined with a filtering system that is efficient and stable over long periods between cleaning of the filters while removing substantially all powders and other materials from the air stream all as more particularly described above and in the concurrently filed application referred to.

It should be understood that although the present invention has been described at some length and in considerable detail and with some particularity with regard to several embodiments in connection with the accompanying figures and description, all such description and showing is to be considered as illustrative only and the invention is not intended to be narrowly interpreted in connection therewith or limited to any such particulars or embodiments, but should be interpreted broadly within the scope of the delineation of the invention set forth in the accompanying claims thereby to effectively encompass the intended scope of the invention.

I claim:

1. An apparatus for digesting used fluorescent tubes and separating glass and toxic powder components thereof from each other comprising:
   (a) a fracture chamber in which a rotating blade fractures fluorescent tubes into limited diameter glass particulates,
   (b) a countercurrent gas flow chamber interconnected with the fracture chamber,
   (c) at least one baffle means extending into the countercurrent gas flow chamber from an interior surface of said countercurrent flow chamber at a downwardly inclined angle arranged and positioned to intersect glass material descending through the countercurrent gas flow chamber for impacting and jarring such material to separate powder material from the surface of the glass material,
   (d) the baffle means having an upper contact surface inclined at an angle and spaced from the last likely contact of glass particulates with a solid surface prior to striking such upper contact surface such that the glass particulates are sufficiently jarred by forceful contact with said upper contact surface to dislodge powder from the surfaces of said glass particulates but insufficient to cause additional fractures of the glass particulates.

2. An apparatus in accordance with claim 1 wherein there are a plurality of baffle means extending into the countercurrent gas flow chamber.

3. An apparatus in accordance with claim 2 wherein the baffle means at least partially define a tortuous pathway through the countercurrent gas flow chamber.

4. An apparatus in accordance with claim 3 wherein at least some of the baffle means are provided with vibrational means to move said baffle means perpendicularly with respect to their major planes.

5. An apparatus in accordance with claim 3 wherein at least some of the baffle means are provided with a transitional movement effecting means to move the baffle means perpendicularly with respect to their major planes.

6. An apparatus in accordance with claim 1 wherein a stripping gas offtake from the fracture chamber and countercurrent gas flow chamber is positioned contiguous to the upper baffle.

7. A method of digesting used fluorescent tubes and separating component elements of said tubes including fractured glass materials and powder derived from the interior surfaces of such tubes comprising:
   (a) fracturing a fluorescent tube within a fracturing chamber,
   (b) passing fractured glass particulates from said fracturing chamber to a countercurrent flow chamber where said particulates are jarred by impaction upon at least one jarring surface with a force that will jar the glass particulates to remove and loosen powder from and upon the surface of said fractured glass particulates, but will not tend to fracture said particulates,
   (c) exposing the glass particulates to a countercurrent flow of stripping gas in the countercurrent flow chamber to loosen and carry away entrained in such countercurrent stripping gas toxic powder adhered to the surface of said fractured glass particulates including powder that has been loosened by jarring the glass particulates.

8. A method in accordance with claim 7 wherein the particulates are jarred by impaction upon multiple jarring surfaces.

9. A method in accordance with claim 8 wherein a gas is passed rapidly through the fracturing chamber to entrain powder removed from the surface of the glass particulates during the fracturing operation.

10. A method in accordance with claim 9 wherein the gas passing through the fracturing chamber and the countercurrent flow of stripping gas passing through the stripping chamber are combined and withdrawn from the volume in which they are combined and directed to a particulate removal arrangement including at least one centrifugal separation operation and fine particle filtering operation.

11. A method in accordance with claim 10 wherein the jarring surfaces are translated regularly perpendicularly to their major plane to increase statistical impact with the particulates.

12. A method in accordance with claim 11 wherein at least one of the jarring surfaces is vibrated perpendicularly to its major plane.

* * * * *